March 17, 1931.  E. R. MARTIN ET AL  1,796,570
CERAMIC MACHINE
Filed May 11, 1928  16 Sheets-Sheet 14
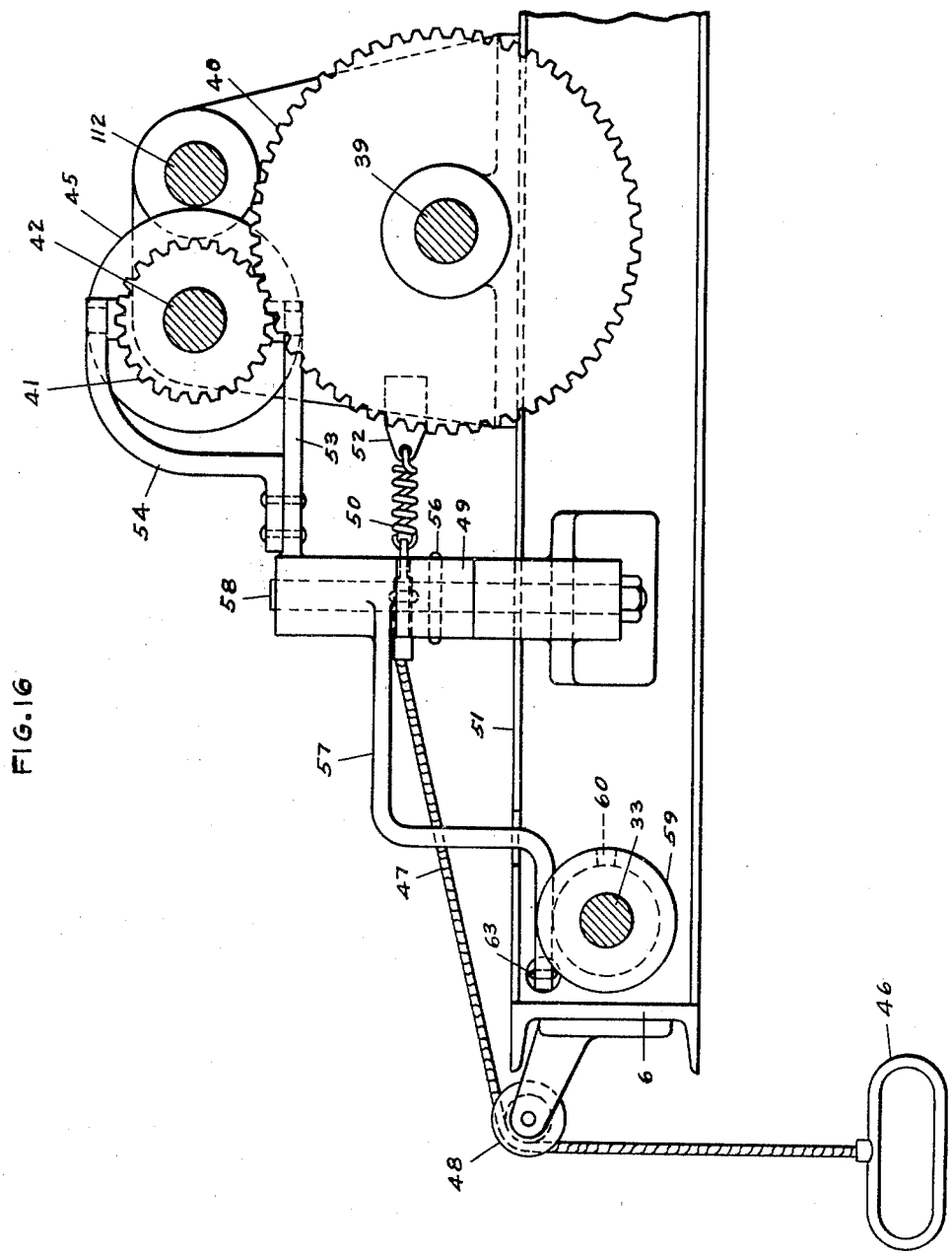
INVENTORS
ELMER R. MARTIN
HOWARD C. BYLAND
CHRISTIAN BALDENHOFER
FRANK L. ORMESHER.
BY Toulmin & Toulmin
ATTORNEYS

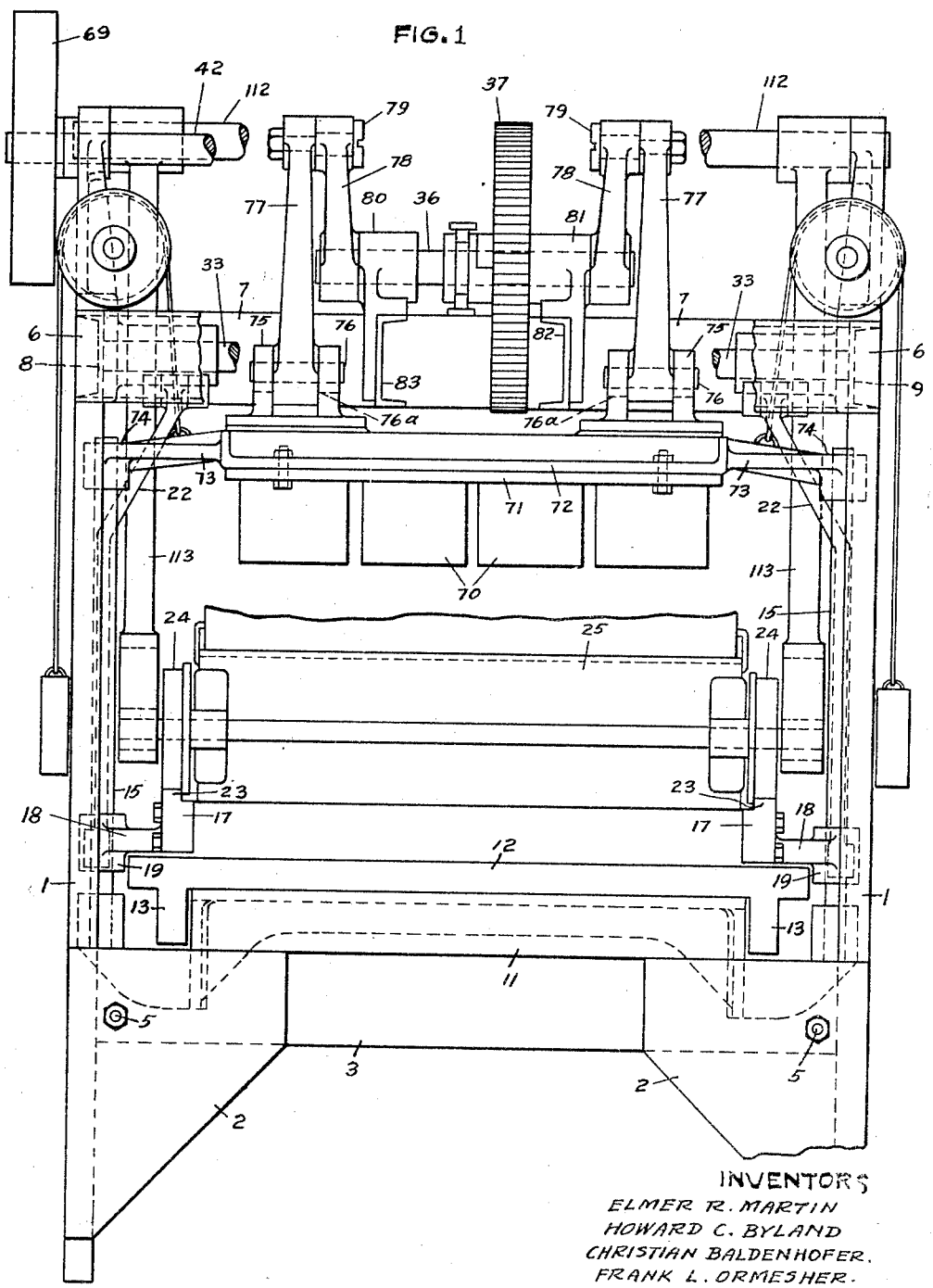

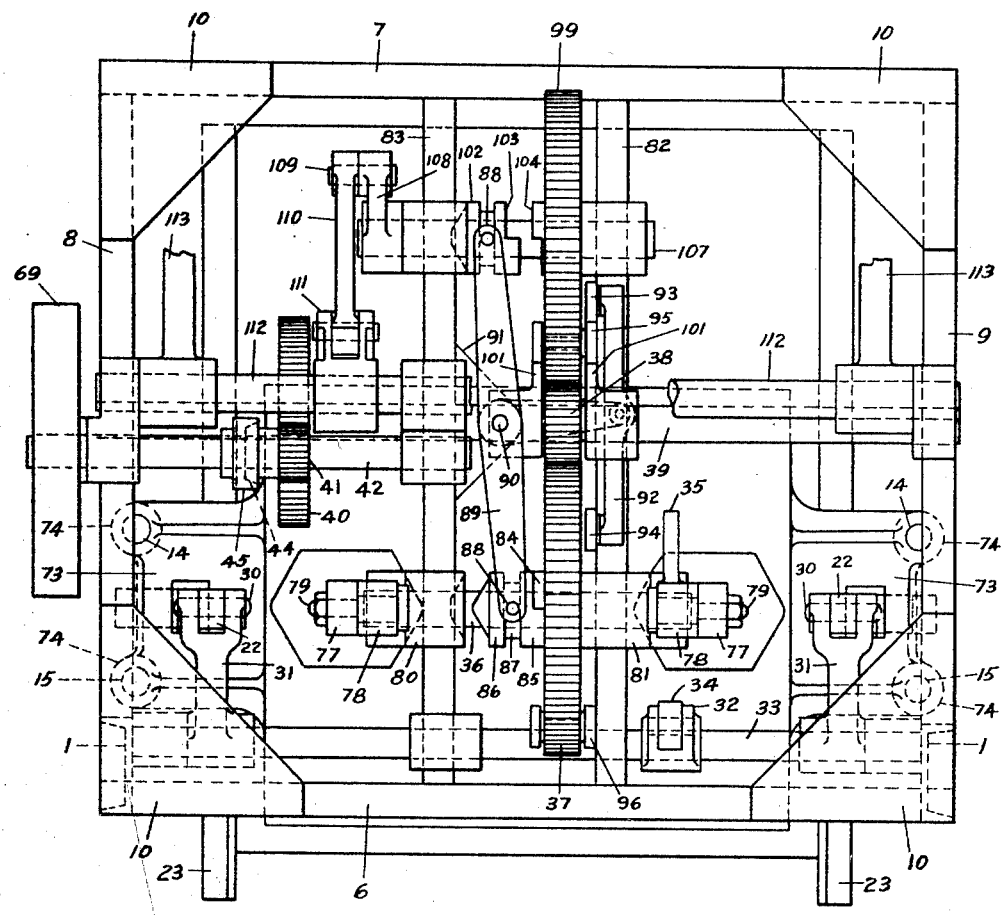

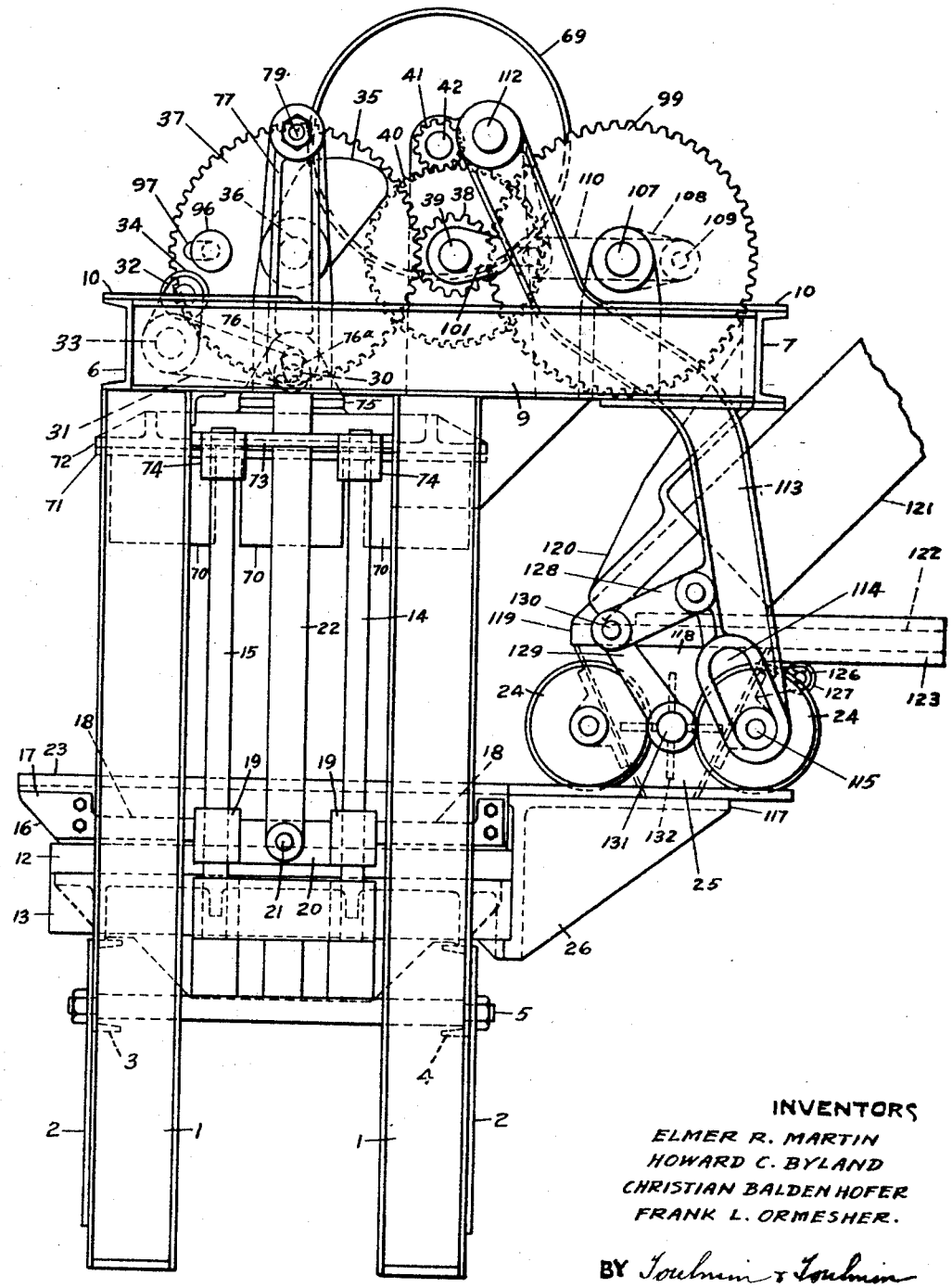

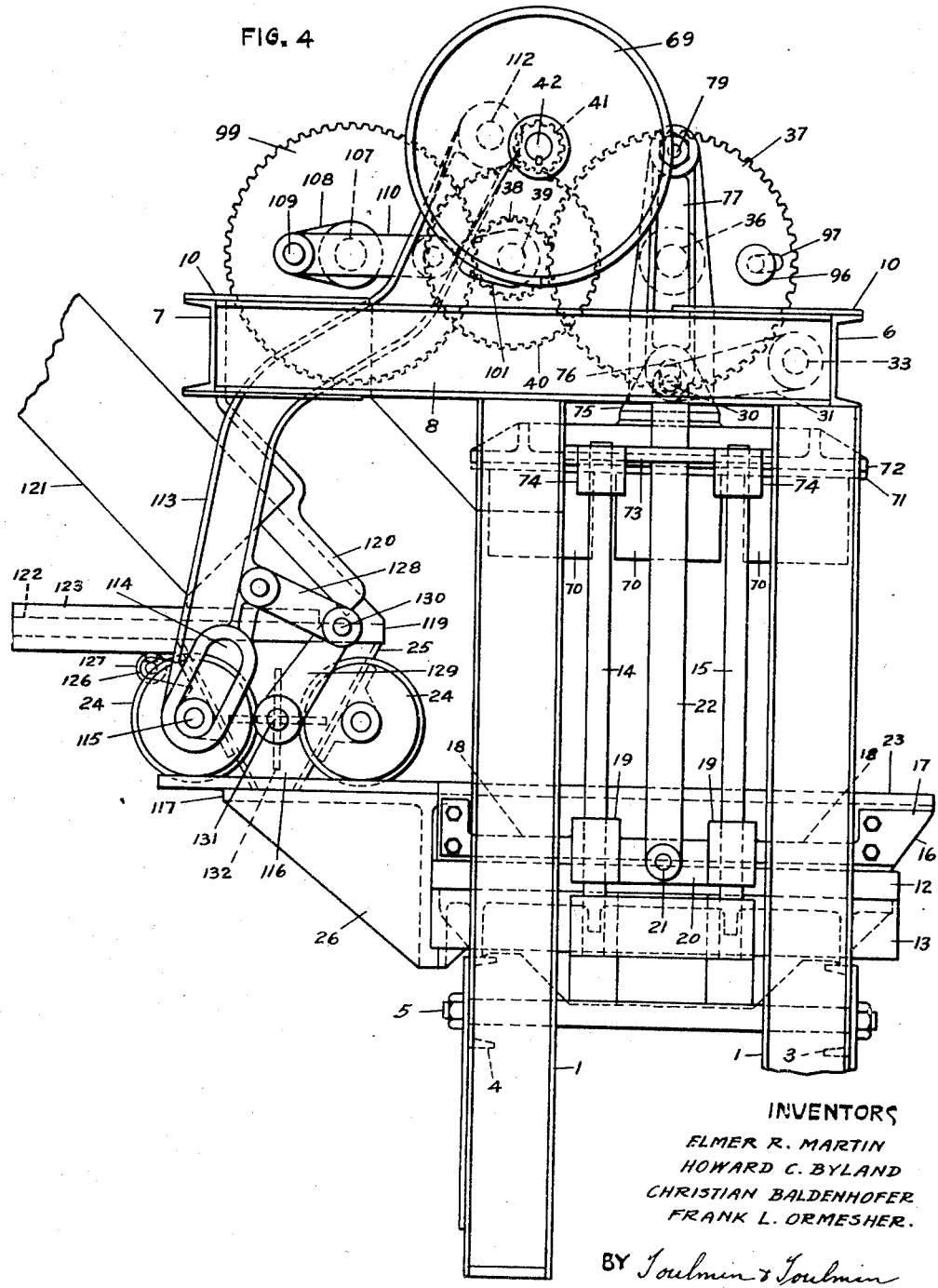

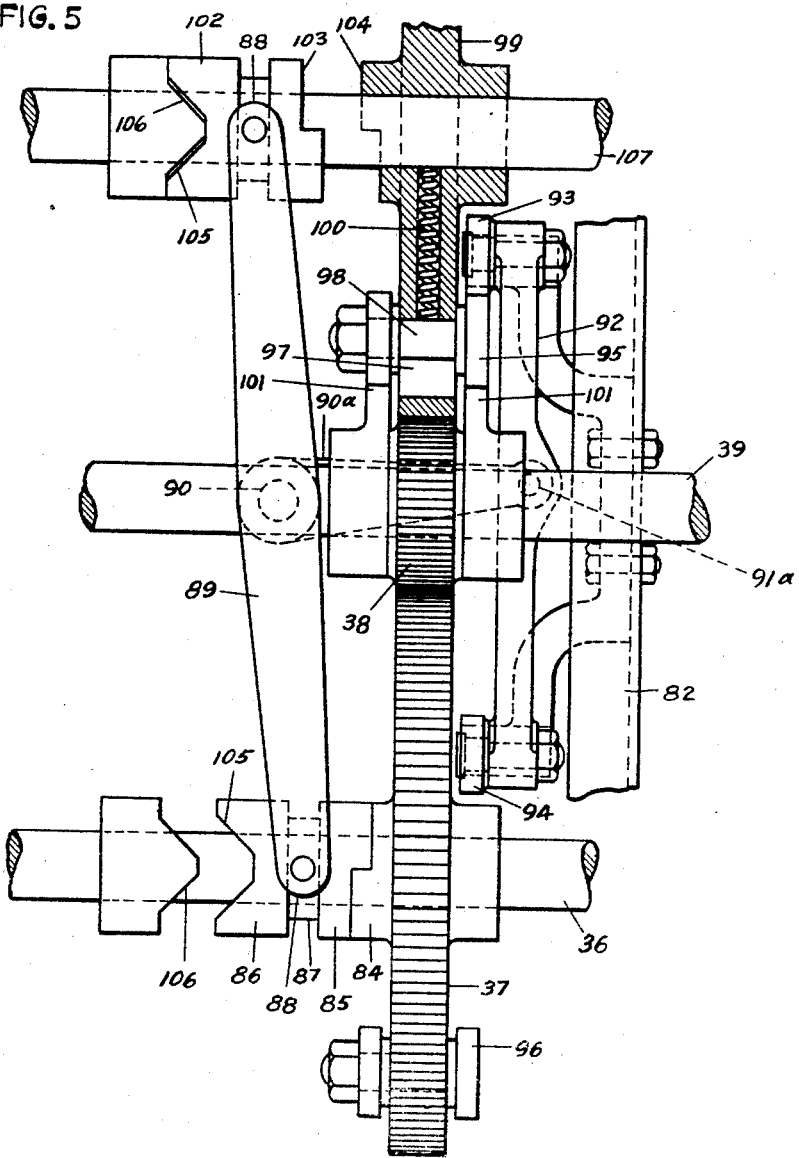

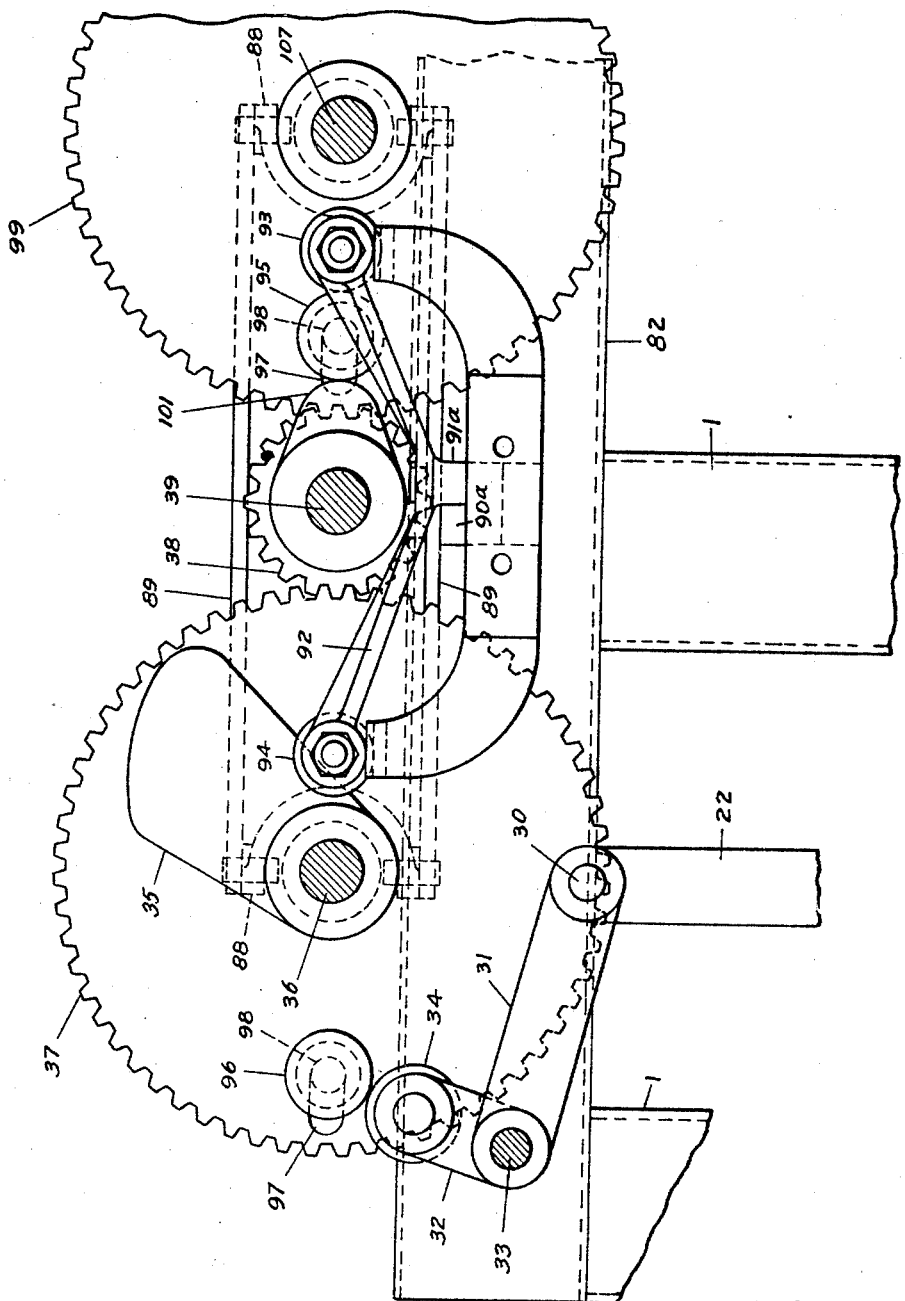

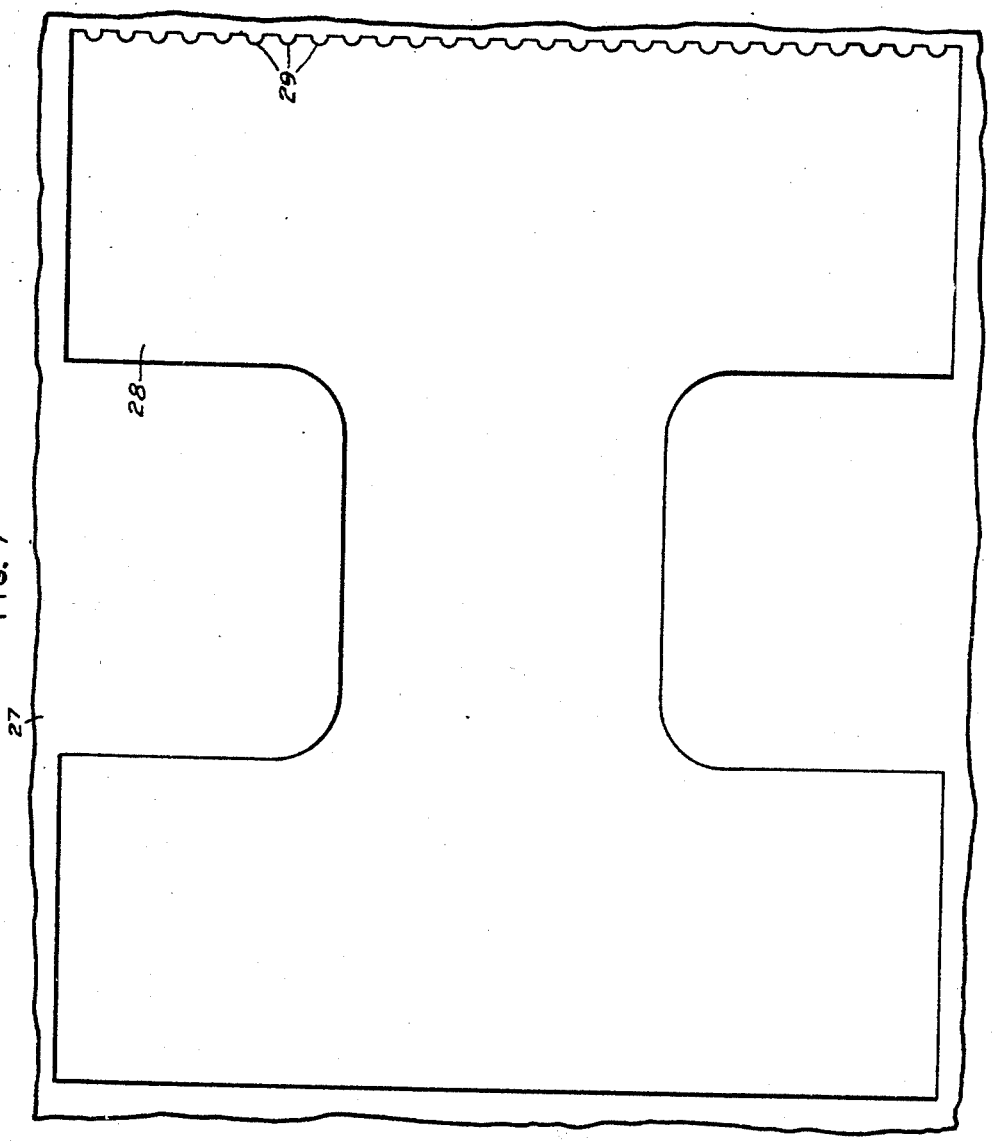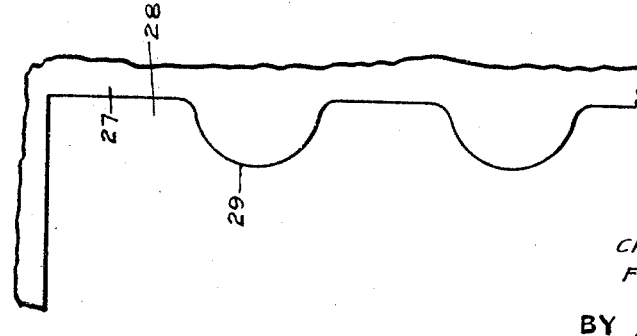

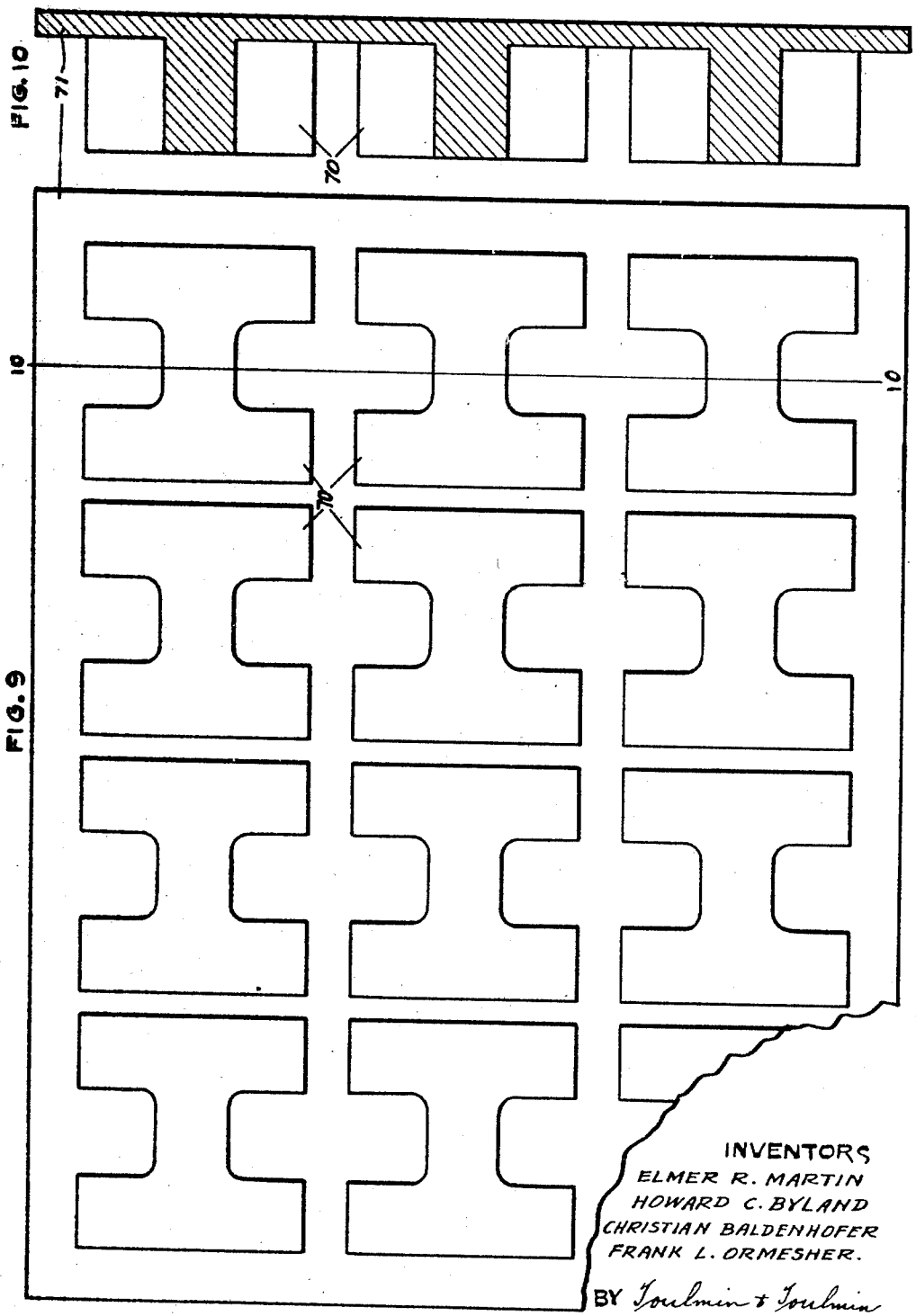

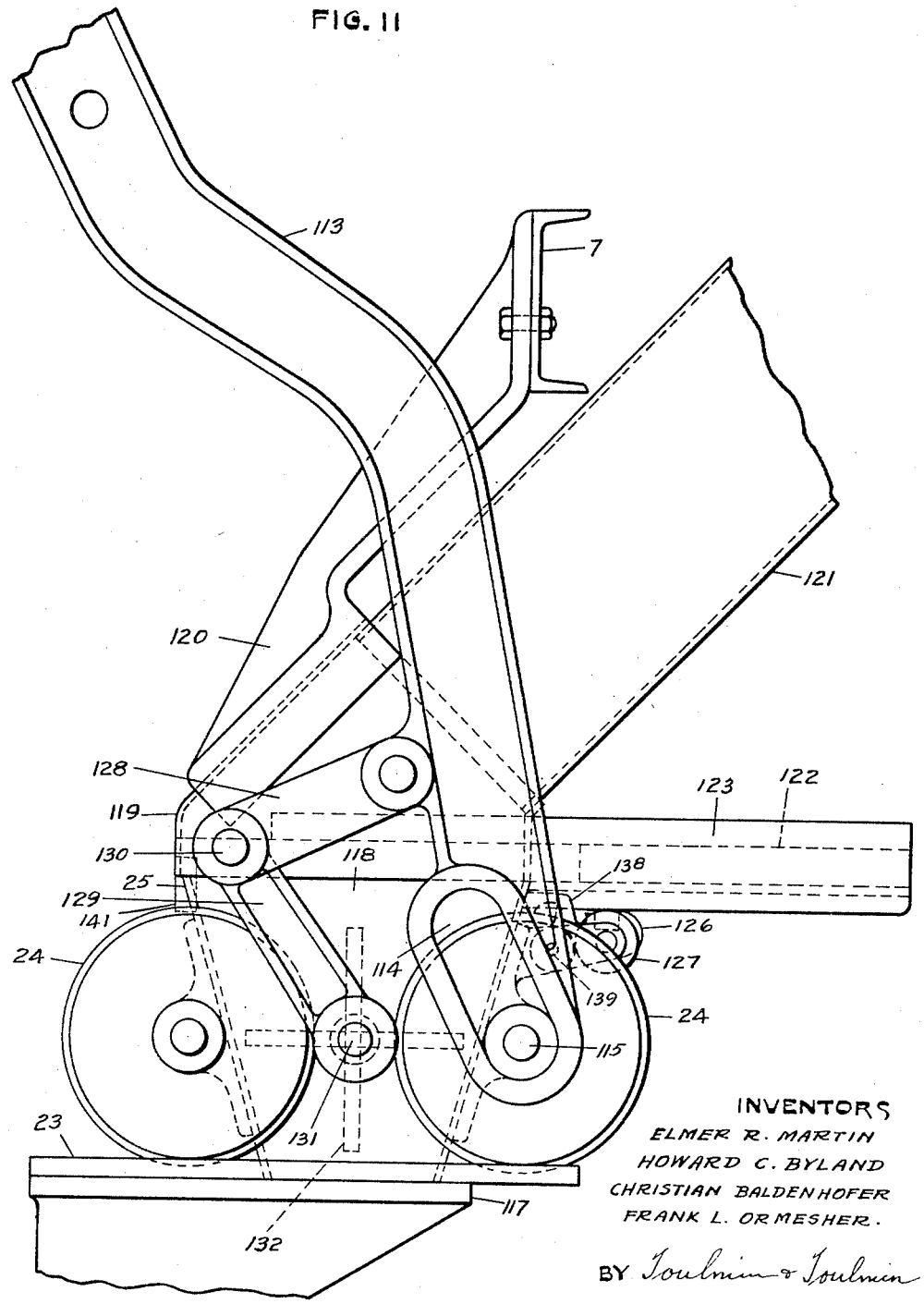

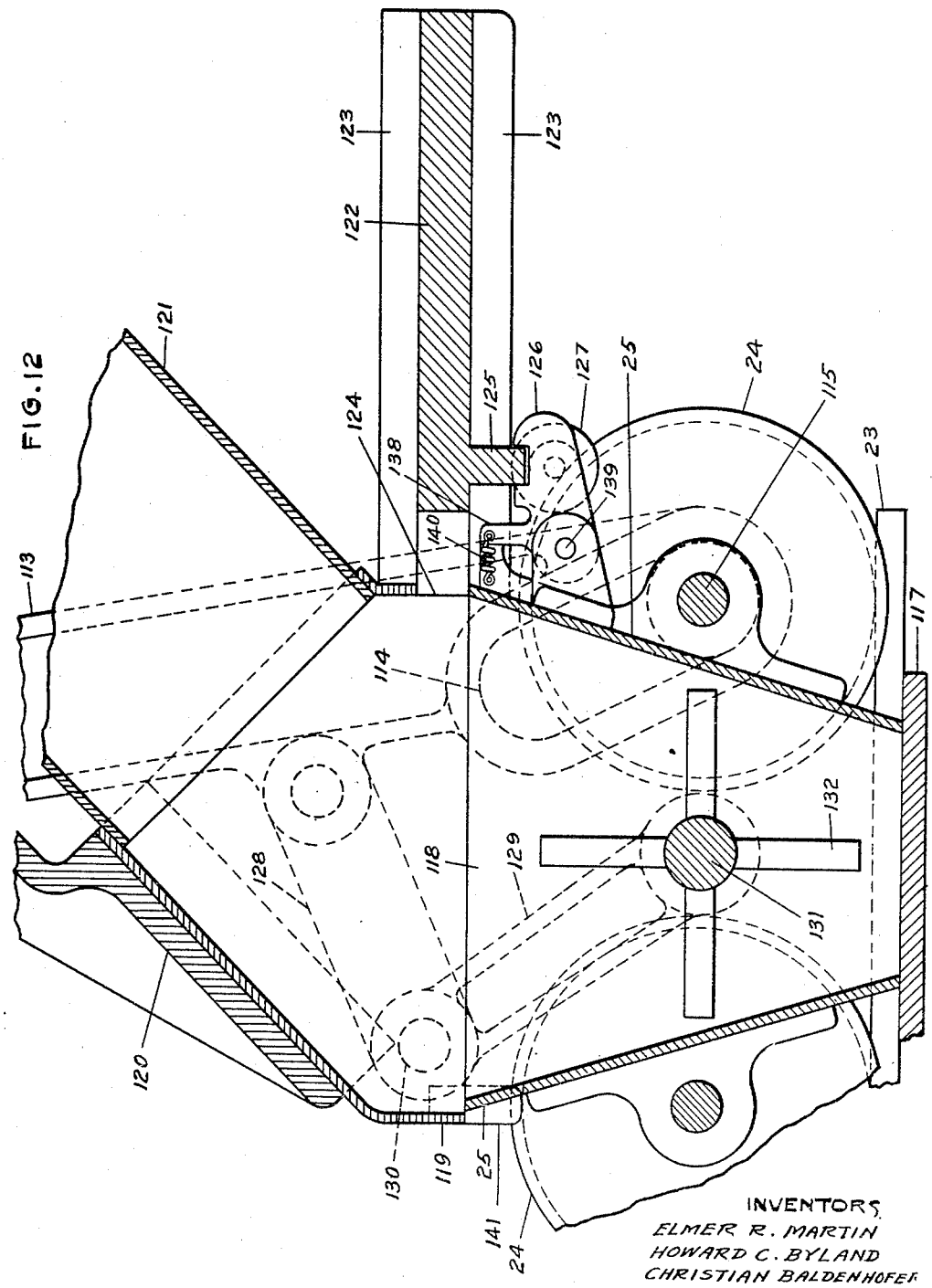

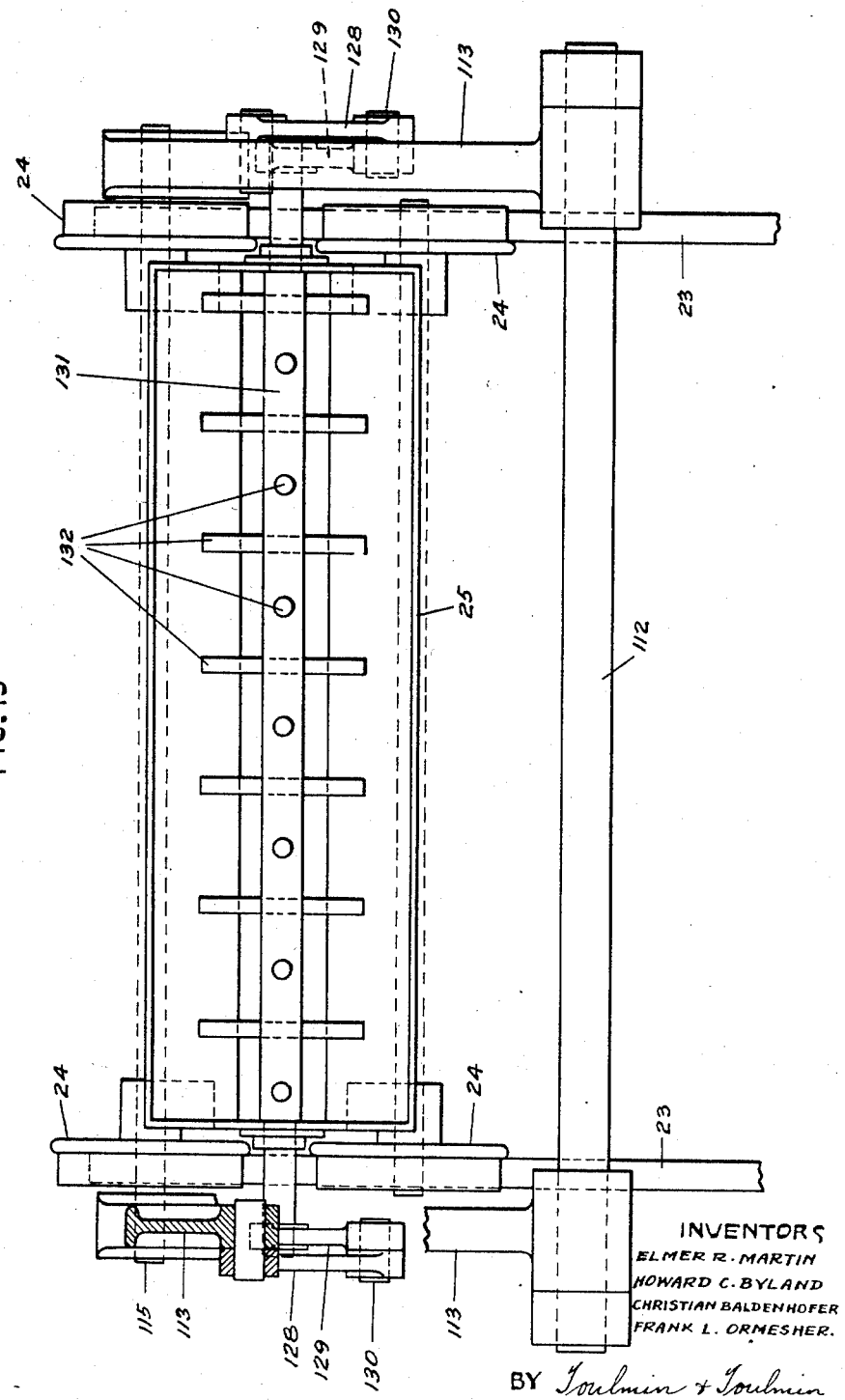

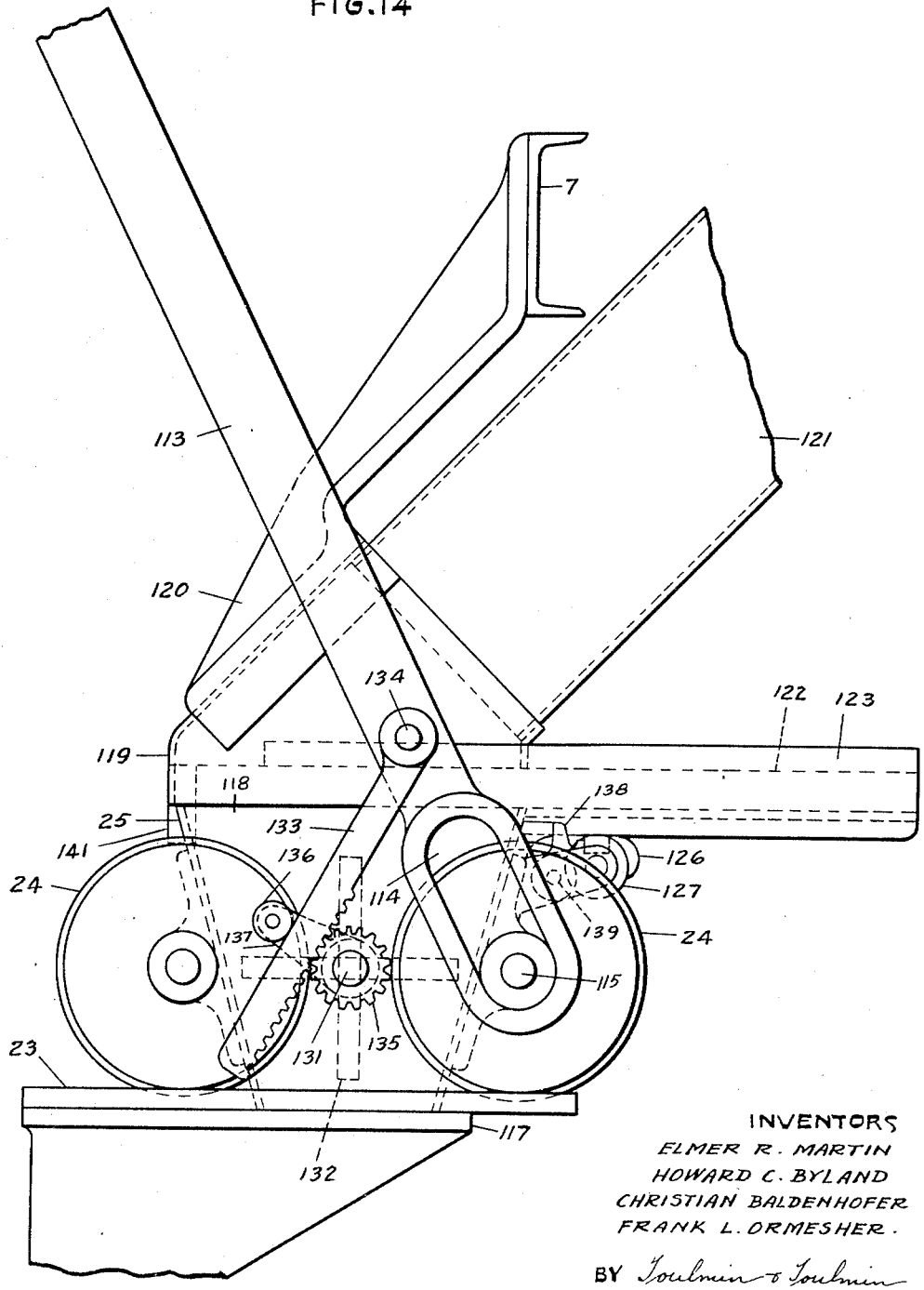

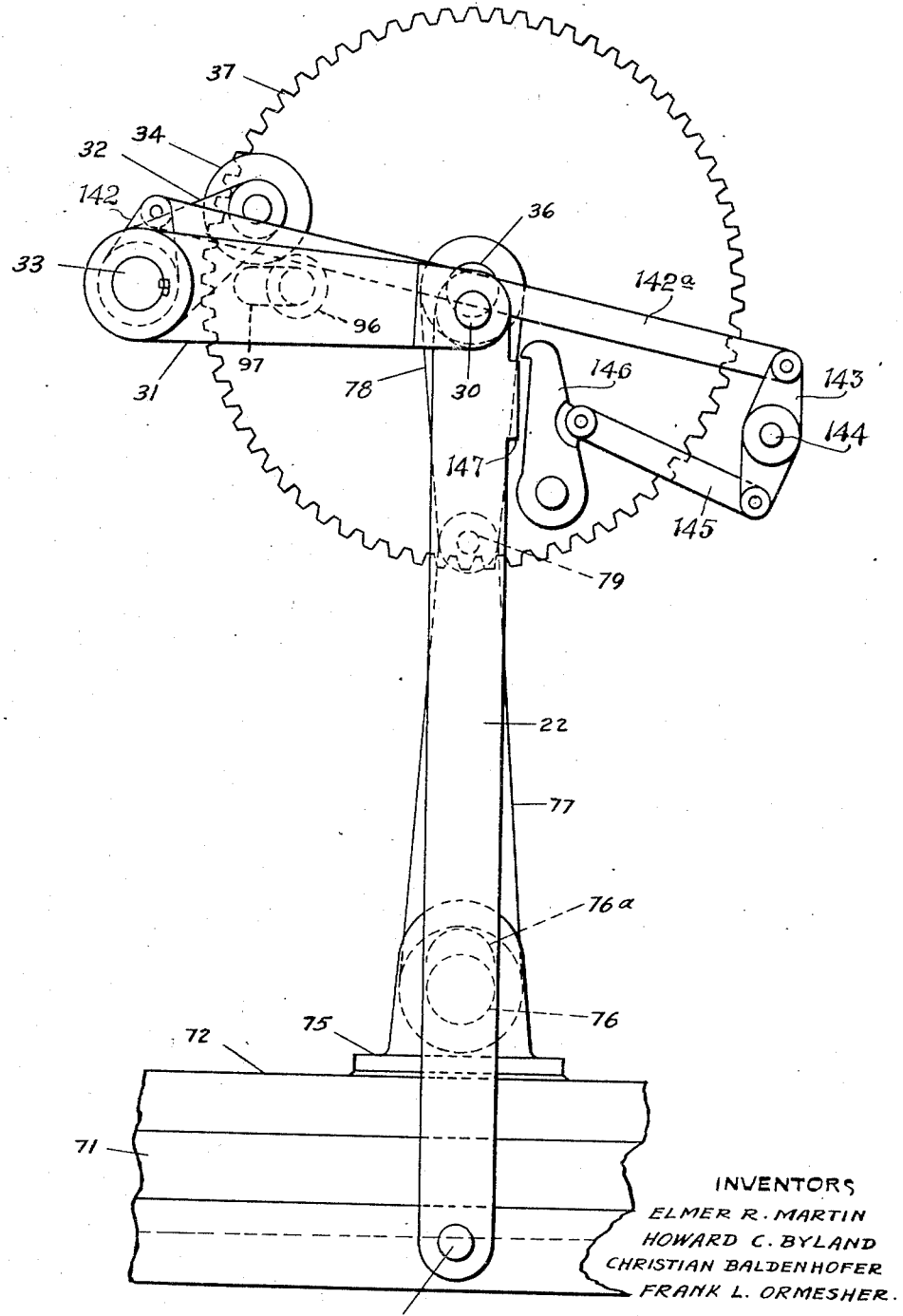

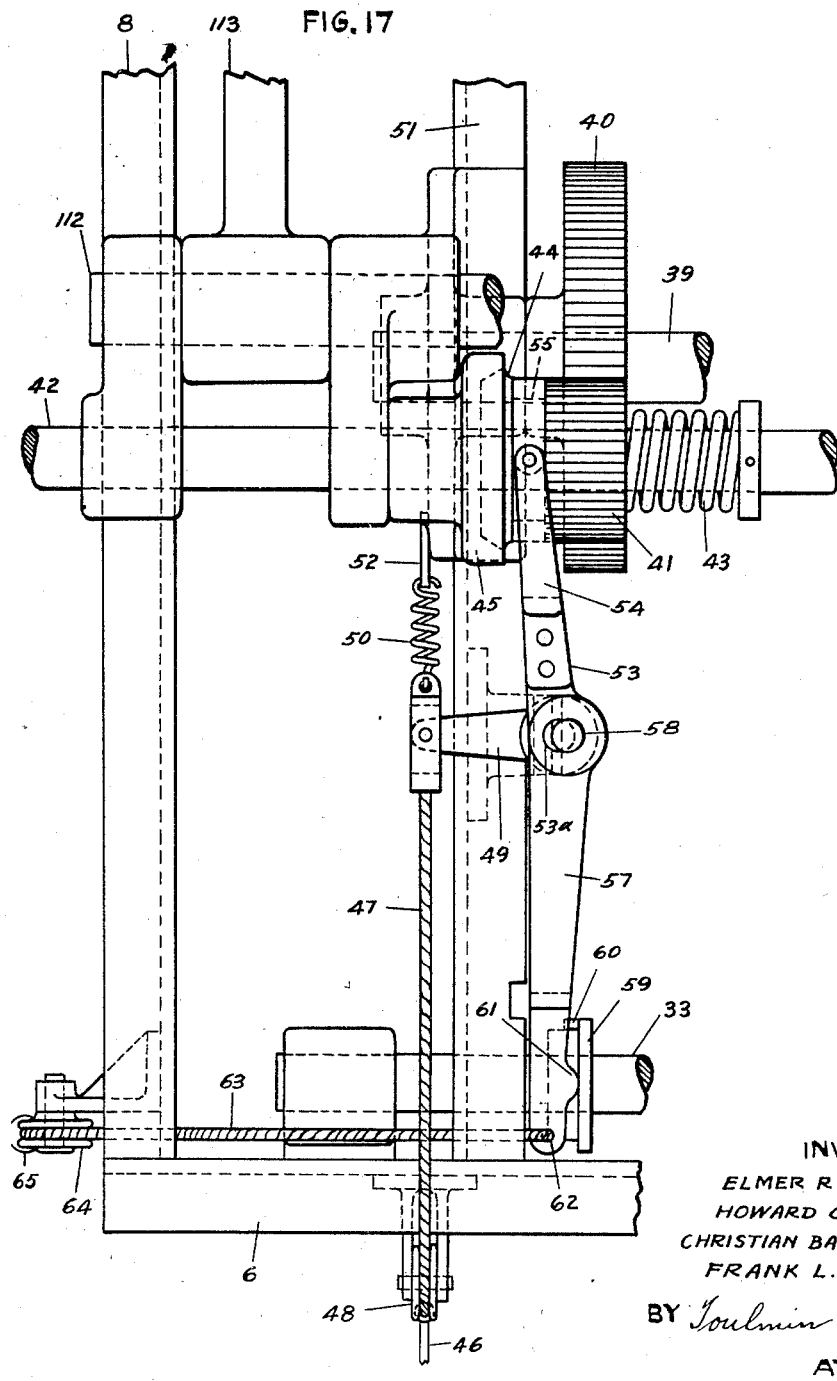

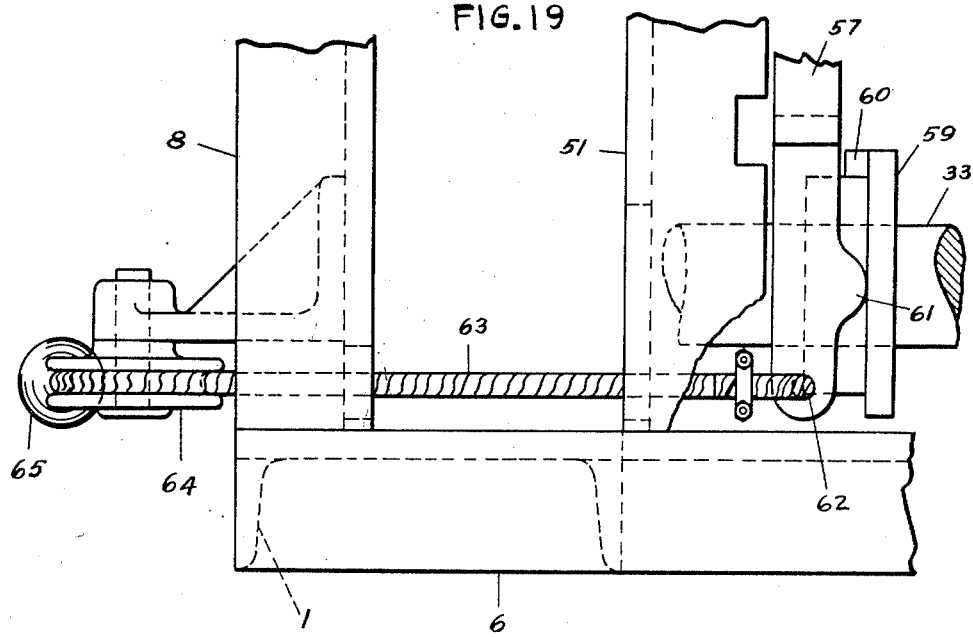
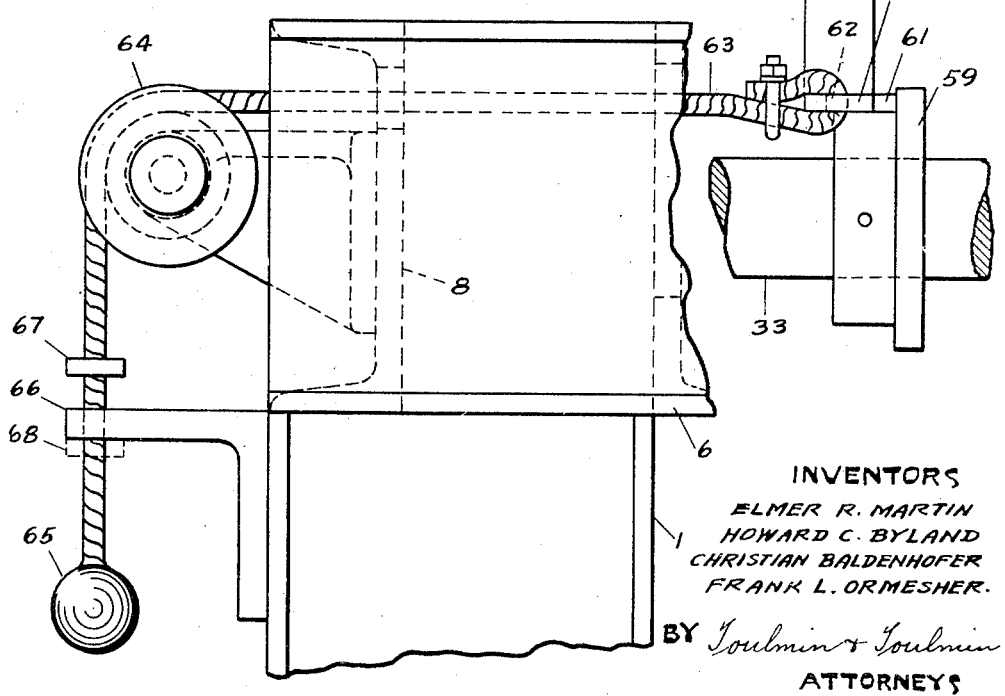

Patented Mar. 17, 1931

1,796,570

UNITED STATES PATENT OFFICE

ELMER R. MARTIN, OF SPRINGFIELD, HOWARD C. BYLAND, OF CINCINNATI, CHRISTIAN BALDENHOFER, OF SPRINGFIELD, AND FRANK L. ORMESHER, OF CINCINNATI, OHIO, ASSIGNORS TO CEMROC, INC., OF CINCINNATI, OHIO, A CORPORATION OF OHIO

CERAMIC MACHINE

Application filed May 11, 1928. Serial No. 276,900.

Our invention relates to machines for manufacturing building material, and, in particular, building units of H-shape of concrete, ceramic materials and the like.

It is the object of our invention to provide a machine in which the movable mold box or die superimposed upon a pallet may be filled with plastic material to which a die is applied under predetermined pressure, such pressure being gradually applied to permit of the material settling, and, thereafter, the die and punch are removed from the molded material to permit of the removal of the pallet with the molded products thereon.

In particular, it is our object to provide this form of pressure punch within the movable die in order to gradually apply pressure to consolidate the material to form it in the desired shape and to so condense and compress it that it will stay in its molded form immediately upon the removal of the mold, die and punch.

It is our object to eliminate pounding, tamping and ramming or the necessity for holding the material in its mold or under pressure for any appreciable time so that quantity production with the minimum of vibration in the machine can be secured.

Referring to the drawings:

Figure 1 is a front elevation of the machine with a portion of the shafts broken away to illustrate the mechanism;

Figure 2 is a top plan view;

Figure 3 is a right hand side elevation;

Figure 4 is a left hand side elevation;

Figure 5 is a detail plan view of the clutch shifting mechanism;

Figure 6 is an end elevation of Figure 5;

Figure 7 is a plan view of the die molding box in detail showing one portion thereof;

Figure 8 is a detail plan view of one corner of the die mold box showing the means of imparting a rough surface to the outer edge of the building unit;

Figure 9 is a bottom plan view of the punch;

Figure 10 is a section on the line 10—10 of Figure 9;

Figure 11 is an enlarged detail side elevation of the feeding hopper and stirring mechanism;

Figure 12 is a vertical section through the feeding hopper and stirring mechanism;

Figure 13 is a top plan view thereof;

Figure 14 is a modified form of the hopper feeding mechanism;

Figure 15 is a detail side elevation of the operating mechanism for the mold box and the die;

Figure 16 is a sectional view showing the means for starting the machine;

Figure 17 is a top plan view thereof;

Figure 18 is a side elevation of the emergency stop mechanism;

Figure 19 is a top plan view thereof.

Referring to the drawings in detail, 1 refers to upright steel corner posts at each corner of the machine forming a rectangular supporting structure. Reinforcing plates 2 are mounted on these vertical corner posts and on the horizontal front and rear transverse connecting plates 3 and 4. Connecting bolts 5 connect these fore and aft members and the uprights at the corners. Thus, a rigid steel frame structure is provided. This structure is connected at its top by the transverse front and rear members 6 and 7 and the fore and aft top members 8 and 9. These members are connected together at their corners by reinforcing corner plates 10.

In the lower part of the machine, there is mounted a transverse horizontal platform member 11 for supporting the removable pallet 12 which has the legs 13 extending on either side of the platform 11. This platform rests upon the transverse members 3 and 4. To the platform is connected the side guide rods 14 and 15. The side guide rods 14 and 15 serve to guide the mold die box 16 which is connected to the rods 14 through the corner plates 17, straps 18 and eyes 19 which slide on the rods 14 and 15. These eyes 19 are engaged by a strap 20 to which is pivoted at 21 the strip link 22 that serves to elevate the mold box a short distance to strip the parts from the molded products which are molded in it. The die box 16 has a track 23 connected thereto on the top edges thereof on the side for guiding the wheels 24 which support the loading hopper 25. The rear end of this track is supported by the rearwardly extending brackets 26 which are attached to the posts 1.

This mold box die contains the die member 27 which has a plurality of spaced H-shaped openings 28, one wall of which forms the outer wall of the unit when molded is provided with a plurality of spaced upright, inwardly projecting ribs 29 to give a rough surface to the outer face of the building unit.

This mold box is elevated through the arms 22 which are pivotally connected at 30 to a bell crank consisting of the arms 31 and 32 pivoted on the shaft 33. The arm 32 carries a cam roller 34. This cam roller is engaged by the cam known as a strip cam 35 that is mounted upon a shaft 36 and turns with the shaft. This shaft is driven by the gear 37 which, in turn, derives its power from the pinion 38. The pinion 38 is on the shaft 39. The shaft 39 is driven by the gear 40 and pinion 41 on the power shaft 42. The pinion 41 is connected to the power shaft 42 by means of the spring 43 which forces the clutch face 44 of the pinion 41 into engagement with the clutch face 45 which turns with the power shaft 42 as a part thereof. This clutch is controlled for starting and stopping the machine through the following mechanism.

Starting and stopping mechanism

To start the machine, the handle 46 is pulled downwardly, which pulls the cable 47 guided by the pulley 48 and thereby actuates the arm 49 against the tension of the spring 50 which is connected to the frame of the machine 51 on the bracket 52. This serves to move the clutch faces 44 and 45 into engagement. This engagement is effected because 49 is connected to the arm 53 which carries a yoke 54 that works in the groove 55 in the collar which is a part of the clutch member 44. The arm 49 is pinned to the eccentric 53a by the pin 56. The eccentric 53a forms the pivot for the lever 57. The pulling of the arm 49 to start the machine moves the pivot 58 but, as soon as the machine is started the mold stripper arm shaft 33 moves with its cam 59 to normal position. When the high point 60 of the cam is turned at the end of a complete revolution of the machine to disconnect the power, it engages with the cam nose 61 of the lever 57 and thereby operates the clutch yoke 54 declutching the power and bringing the machine to rest.

While the mold die box is being lifted away from the formed products, which is known as the mold stripping action the cam high point 60 is advanced to the top of the shaft to engage the nose 61 to declutch the clutch as that is the end of the sequence of operations.

Emergency stop mechanism

The end of the lever 57 is provided with an eye 62 to which is connected a cable 63 that passes downwardly over a pulley 64 to the side of the machine terminating in a handle 65. By pulling this cable which passes through the guide 66 the clutch may be declutched at any time to stop the machine.

A button 67 is formed on the cable to limit the extent of the pull and to indicate when the clutch is declutched while the button 68 is adapted to determine the position when the clutch is engaged. The power shaft 42 is driven through the pulley 69.

Punch or pressing mechanism

The punch consists of a plurality of H-shaped punch members designated 70 carried on the plate 71 which is attached to the punch frame 72 that has a bracket on either side 73 with spaced eyes 74 sliding on the uprights 14 and 15, which guide the reciprocatory movement of the punch or pressing head.

This frame 72 is provided with a spaced pair of ears 75 carrying a cross shaft 76 on which is pivoted the arm 77 which comprises a portion of one half of the toggle pressure links, the other half of which is formed by the lever 78 that is pivotally connected on the pivot 79 to the lever 77 and is fixed to the shaft 36 which actuates the toggle. The cross shaft 76 is mounted in the slot 76a in the ears 75 to permit of the continued movement of the toggle pressure links 77 and 78 for a brief period without moving the die upwardly in order to hold the compressed products on the pallet 12 while the mold box is being lifted upwardly to strip the mold box from the molded product. This loose joint by reason of the slots 76a permits of this movement.

This shaft 36 is driven by the gear 37. This shaft is journaled in the bearings 80 and 81 which are mounted on the cross frame members 82 and 83. The gear 37 which is mounted on the shaft 36 is loosely mounted thereon. It carries a clutch face 84 which is adapted to engage with the clutch face 85 of a clutch 86 which turns with the shaft 36 being splined thereto but is laterally slidable thereon. This clutch 86 is provided with a groove 87 in which is mounted a yoke 88 of a clutch shifting lever 89 that is pivoted at 90 on the bracket 91 of the frame member 83. This lever 89 is composed of an upper and lower lever portion above and below the shaft 39 which drives the gear 37.

In order to effect the shifting of this clutch, we provide the lever 90a which is affixed to the clutch shifting lever 89 at right angles thereto. The free end of this lever is pivoted at 91a to a transversely reciprocable roller shaft 92 carrying cam rollers 93 and 94 on either end thereof. These cam rollers are engaged by the gear rollers 95 and 96 which are adapted to reciprocate radially in slots 97 with shafts 98 in the gears 37 and 99. Springs 100 in such gears tend to thrust the shafts and rollers radially of the gears. Mounted on the shaft 39 are spaced cams 101 which engage at intervals with the rollers 95 and 96 which in turn engage the rollers 93 and 94 moving the roller shaft 92 transversely and thereby shifting the clutch 86 and the companion clutch 102 which is adapted through its face 103 to engage with the clutch face 104 of the gear 99 and thereby causing actuation of the load mechanism hereinafter described. Each of the clutches 86 and 102 are provided with similar faces 105 engaging with the surfaces 106.

Loading mechanism

The loading mechanism is operated through the gear 99 on the shaft 107. This shaft 107 carries an arm 108 pivoted at 109 to the arm 110 which in turn is mounted pivotally on the crank 111 fastened to the shaft 112. Connected to this shaft 112 are a pair of spaced depending loading arms 113. These arms are provided with slots 114 at their lower ends which engage with the outside of the axle 115 of the wheels 24 on the rim of the loading hopper 25. The movement forwardly of these arms serve to move the loading hopper on its wheels 24 on the track 23 to load the mold box.

Hopper mechanism

This hopper mechanism is shown in detail in Figures 11, 12, 13 and 14. The hopper box is opened at the bottom and, when in withdrawn position, is sealed by the bottom of the platform designated 117. The top of the hopper is open at 118 and registers with the open mouth of the chute 119 which is carried in the frame work 120 that is suspended from the rear of the machine frame. This chute 119 is connected to a supply box or chute 121. The hopper box reciprocates beneath the chute 119. As it is necessary to cut off the chute 119 to stop the flow of concrete into the hopper box 25 when the hopper box is moved forwardly into delivery position, we provide a sliding cut off 122 which slides in the side guides 123. This slide cut off is adapted to pass through the opening 124 in the rear wall of the chute 119. The slide cut-off 122 is provided with a depending lug 125 which is connected by the hook 126 on the back of the hopper box 25. Guide rollers 127 are connected to the box in the bottom of the slide 123 to guide the parts relative to one another.

The arm 126 carries a lug 138 that is attached by the spring 140 to the hopper box 25 so that the hook is always held in engaging position with the lug 125. The roller 127 carried on the end of the member 126 is adapted to engage with the lug 141 carried on the frame 123 which serves to unlock the member 126 from the lug 125 to allow the slide to remain in its closed position while the hopper box 25 moves over the mold box to discharge its contents. Connected to the depending arms 113 is a bell crank composed of the arms 128 and 129 pivoted at 130. The lower end of the arm 129 is connected to the stirrer shaft 131 carrying the blades 132 to stir the contents of the hopper box and distribute the contents in the mold box.

An alternate form of this apparatus is shown in Figure 14 where the rack bar 133 is substituted for the bell crank. One end of the bar is free and the other is pivoted to the arm 113. The rack is maintained in engagement with the pinion by the roller 136 carried on the arm 137 mounted on the shaft 131. Thus, as the filler box reciprocates its contents is stirred and distributed.

In order to hold the mold box in its lower position, we provide a locking mechanism consisting of a lever mounted on the shaft 33, such lever being designated 142. This lever actuates a pitman 142a that in turn moves a lever 143 pivotally mounted at 144 on the frame of the machine. This lever is connected to a pitman 145 that controls a locking latch 146 that is adapted to engage with a locking shoulder 147 on the link 22.

Method of operation

When the handle 46 is pulled the clutch faces 44 and 45 are engaged and the line of power through the shaft 42, gear 41, gear 40 and shaft 39 is established. This results in the driving of the pinion 38 and the rotating of the gears 37 and 99. The parts are so arranged that this rotation will shift the clutch 102 to engage the gear 99 causing the shaft 107 to rotate. This results in the actuation of the actuating hopper box arms 113 so that the hopper is moved over the mold box, the bottom of which is closed by the new pallet 12 filling the mold box and restoring the hopper to its initial position where the concrete in the chute 119 refills the box by reason of the withdrawal of the closing slide 122.

As soon as this operation has been completed the cams 101 will have engaged with the rollers 96 and shifted the clutch lever so that the clutch 102 is disengaged from the gear 99 and the clutch 86 is engaged with the gear 37 thereby actuating the shaft 36 which causes the punch or pressing member to descend into the mold box.

As the toggle links 77 and 78 pass over dead center about a ton of pressure is gradually applied to the concrete expelling surplus moisture and forming it into a solid mass.

When the parts are in this position the pressing or punch members are left in this pressing position for a brief interval because as the toggles 77 and 78 start to return in their cycle of operations to lift the pressing punch, the punch is not operated due to the loose joint or slot 76a. While the punch is remaining stationary and undisturbed during this brief interval the cams 35 are moved into position to engage the roller 34 and actuate the bell crank arms 32 and 31 which, in turn, lift the links 22 and cause the mold box and molds to be stripped from the molded products on the pallet, at which time the operator can remove the pallet before the weight of the mold box causes its return on to a new pallet which has been reinserted due to the passage of the cam 35 by the roller 34. As soon as the stripping action has been accomplished the toggle members 77 and 78 will have again picked up the punch or pressing mechanism and elevated it to its initial elevated position and when that position has been accomplished the clutch 44 and 45 will have been declutched by the operation of the cams 59 and 60 on the cam nose 61 of the lever 57 which controls shifting yoke lever 53 and the yoke 54. The machine then comes to rest.

It will be understood that we desire to comprehend within our invention such modifications as may be necessary to adapt it to varying conditions and uses.

Having thus fully described our invention, what we claim as new and desire to secure by Letters Patent, is:—

1. In a building material machine, a supporting pallet for material, a mold, a pressing member, and means to gradually apply pressure on said pressing member, said means having a loose connection with the pressing member and being so arranged as to permit of the holding of said pressure for a predetermined interval.

2. In a building material machine, a supporting pallet for material, a mold, a pressing member, means to gradually apply pressure on said pressing member, said means having a loose connection with the pressing member and being so arranged as to permit of the holding of said pressure for a predetermined interval, and means to move said mold relative to the molded material to strip it therefrom while said pressure means is stationary.

3. In a building material machine, a supporting pallet for material, a mold, a pressure member, means to gradually apply pressure on said pressing member, said means having a slotted connection with the presser member and being so arranged as to permit of the holding of said pressure for a predetermined interval, means to move said mold relative to the molded material to strip it therefrom while said pressure means is stationary, and means to elevate the pressing means.

4. In a building material machine, a supporting pallet for material, a mold, a pressure member, means to gradually apply pressure on said pressing member, said means having a slotted connection with the presser member and being so arranged as to permit of the holding of said pressure for a predetermined interval, means to move said mold relative to the molded material to strip it therefrom while said pressure means is stationary, means to elevate the pressing means, and means to introduce material to be molded into the mold while the pressing means is elevated.

5. In a building material machine, a supporting pallet for material, a mold, a pressure member, means to gradually apply pressure on said pressing member, said means having a slotted connection with the presser member and being so arranged as to permit of the holding of said pressure for a predetermined interval, means to move said mold relative to the molded material to strip it therefrom while said pressure means is stationary, means to elevate the pressing means, means to introduce material to be molded into the mold while the pressing means is elevated from a continuous source of supply, and means to cut off said source of supply while the predetermined quantity of said material to be molded is discharged into the mold.

6. In a building material machine, a removable pallet, a mold box removably mounted thereon, a pressing means adapted to be lowered into said mold box to form plastic material under pressure therein on the pallet, and toggle means having a loose connection with the pressing means arranged to supply pressure to the pressure means whereby as the toggle means passes over dead center the maximum of pressure will be exerted and then the pressure means will be withdrawn.

7. In a building material machine, a removable pallet, a mold box removably mounted thereon, a pressing means adapted to be lowered into said mold box to form plastic material under pressure therein on the pallet, toggle means having a loose connection with the pressing means arranged to supply pressure to the pressure means whereby as the toggle means passes over dead center the maximum of pressure will be exerted and then the pressure means will be withdrawn, and means to guide the reciprocation of the pressure means for the accurate delivery of the pressure by the pressure means through the toggle means.

8. In a building material machine, a removable pallet, a mold box removably mounted thereon, a pressing means adapted to be lowered into said mold box to form plastic material under pressure therein on the pallet, toggle means arranged to supply pressure to the pressure means whereby as the toggle means passes over dead center the maximum of pressure will be exerted and then the pressure means will be withdrawn, means to guide the reciprocation of the pressure means for the accurate delivery of the pressure by the pressure means through the toggle means, and a loose joint between the toggle means and the pressure means whereby the toggle means may move a predetermined distance after the maximum pressure has been applied before the pressure means has started on its return movement to its initial position.

9. In a building material machine a pallet, a reciprocable mold box, a reciprocable pressure means adapted to enter the mold box, a common source of power, means for lowering a pressure means and gradually applying pressure thereon, means for lifting the mold box to strip it from the molded material while the pressure means is stationary after the maximum application of pressure, means for picking up and elevating the pressure means after the stripping action of the mold box has taken place, and means allowing the mold box to return to its initial position, means for rendering the pressure means inoperative upon its return to its initial position, and means for rendering operative a loading means which is moved over the mold box and returned to its initial position for securing another load of plastic material, and a common power means for actuating all of said means.

10. In a building material machine, a pallet, a reciprocable mold box, a reciprocable pressure means adapted to enter the mold box, a common source of power, means for lowering a pressure means and gradually applying pressure thereon, means for lifting the mold box to strip it from the molded material while the pressure means is stationary after the maximum application of pressure, means for picking up and elevating the pressure means after the stripping action of the mold box has taken place, means allowing the mold box to return to its initial position, means for rendering the pressure means inoperative upon its return to its initial position, means for rendering operative a loading means which is moved over the mold box and returned to its initial position for securing another load of plastic material, a common power means for actuating all of said means, and means for automatically disconnecting said common power means at the end of each cycle of operations, the movement of the loading means constituting the first step in the cycle of operations.

11. In a building material machine, a pallet, a reciprocable mold box, a reciprocable pressure means adapted to enter the mold box, a common source of power, means for lowering a pressure means and gradually applying pressure thereon, means for lifting the mold box to strip it from the molded material while the pressure means is stationary after the maximum application of pressure, means for picking up and elevating the pressure means after the stripping action of the mold box has taken place, means allowing the mold box to return to its initial position, means for rendering the pressure means inoperative upon its return to its initial position, means for rendering operative a loading means which is moved over the mold box and returned to its initial position for securing another load of plastic material, a common power means for actuating all of said means, means for automatically disconnecting said common power means at the end of each cycle of operations, the movement of the loading means constituting the first step in the cycle of operation, and manual means for starting said mechanism.

12. In a building material machine, a pallet, a reciprocable mold box, a reciprocable pressure means adapted to enter the mold box, a common source of power, means for lowering a pressure means and gradually applying pressure thereon, means for lifting the mold box to strip it from the molded material while the pressure means is stationary after the maximum application of pressure, means for picking up and elevating the pressure means after the stripping action of the mold box has taken place, means allowing the mold box to return to its initial position, means for rendering the pressure means inoperative upon its return to its initial position, means for rendering operative a loading means which is moved over the mold box and returned to its initial position for securing another load of plastic material, a common power means for actuating all of said means, means for automatically disconnecting said common power means at the end of each cycle of operations, the movement of the loading means constituting the first step in the cycle of operations, manual means for starting said mechanism, and independent emergency stopping means permitting of the manual disconnection of the power means from the rest of the mechanism at any stage of the operation.

13. In a building material machine, a removable pallet, a movable mold box, a pressure means, said pressure means including a loosely attached toggle arranged to apply pressure gradually and to hold said pressure for a predetermined interval.

14. In a building material machine, a pallet, a mold, a pressure means and a loading means, stripping mechanism, mold elevating and lowering means, a hopper, charging means, a power shaft, gears adapted to actuate the mold stripping means, the pressure actuating means and the loading means adapted to turn continuously, clutch mechanism for connecting the means for the mold stripping mechanism and for the pressure means, actuating means on the one hand and loading mechanism on the other hand, and means on said continuously operating power means for alternately shifting said clutches for alternately operating said mechanism.

15. In a building material machine, a pallet, a mold, a pressure means and a loading means, stripping mechanism, mold elevating and lowering means, a hopper, charging means, a power shaft, gears adapted to actuate the mold stripping means, the pressure actuating means and the loading means adapted to turn continuously, clutch mechanism for connecting the means for the mold stripping mechanism and for the pressure means, actuating means on the one hand and loading mechanism on the other hand, means on said continuously operating power means for alternately shifting said clutches for alternately operating said mechanism, means for connecting power to said continuously operating power means, and means associated with one of said means for disconnecting said power means at the end of a given cycle of operations.

16. In a building material machine, a frame, a mold stripping shaft on said frame having mechanism for elevating a mold, a cam actuated means on said shaft, a pressure means lowering and elevating the shaft, a cam thereon for actuating the mold stripping shaft, a clutch on said pressure shaft, a gear turning loosely thereon adapted to be clutched to said shaft, means on said gear for shifting said clutch, a power driven shaft having a cam thereon for actuating the clutch shifting means on the gear and means on the mold strip shaft for disconnecting the power from the power driving means carrying the clutch shifting cam.

17. In a building material machine, a frame, a mold stripping shaft on said frame having mechanism for elevating a mold, a cam actuated means thereon, a pressure means lowering and elevating the shaft, a cam thereon for actuating the mold stripping shaft, a clutch on said pressure shaft, a gear turning loosely thereon adapted to be clutched to said shaft, means on said gear for shifting said clutch, a power driven shaft having a cam thereon for actuating the clutch shifting means on the gear and means on the mold strip shaft for disconnecting the power from the power driving means carrying the clutch shifting cam, and a third shaft for actuating the loading means, means connecting said third shaft to a loading means to reciprocate it, a clutch on said shaft, a gear loosely mounted on said shaft adapted to be clutched thereto, means on said gear for shifting said clutch, said clutch shifting means being adapted to be actuated by the cam on the power shaft.

18. In a building material machine, a frame, a mold stripping shaft on said frame having mechanism for elevating a mold, a cam actuated means thereon, a pressure means lowering and elevating the shaft, a cam thereon for actuating the mold stripping shaft, a clutch on said pressure shaft, a gear turning loosely thereon adapted to be clutched to said shaft, means on said gear for shifting said clutch, a power driven shaft having a cam thereon for actuating the clutch shifting means on the gear and means on the mold strip shaft for disconnecting the power from the power driving means carrying the clutch shifting cam, and a third shaft for actuating the loading means, means connecting said third shaft to a loading means to reciprocate it, a clutch on said shaft, a gear loosely mounted on said shaft adapted to be clutched thereto, means on said gear for shifting said clutch, said clutch shifting means being adapted to be actuated by the cam on the power shaft, and means interconnecting said clutches whereby when one is in inoperative position the other is in operative position.

19. In a building material machine, a frame, a pallet supported by said frame, a reciprocatory mold guided in the frame, a reciprocatory pressure means guided in the frame, a transversely moving loading means guided in the frame, a power shaft on said frame, power means driving said shaft, clutch means controlling the application of power, a mold stripping shaft connected to the mold, a pressure means lowering and elevating the shaft, a cam thereon, actuating the mold stripping shaft, a gear loosely mounted thereon driven by the power shaft, a clutch thereon, connecting the gear to the pressure shaft, a loading shaft, a gear thereon driven by the power shaft, a clutch thereon adapted to clutch the gear to the loading shaft, link mechanism for connecting the loading shaft to a hopper actuating shaft for loading a hopper actuating shaft, swinging arms attached thereto for moving the hopper transversely of the machine for the mold and in maintaining the clutch shifting means on said gears and on said power shaft, means interconnecting said clutches adapted to be alternately actuated thereby, stirrer means actuated by said loading means, arms for actuating the contents of the loading means as it is reciprocated, means for supplying the loading means continuously, and means associated with the loading means for cutting off said continuous supply during the loading operation.

20. In a building material machine, means for controlling the alternate operation of the loading means, and pressure means in a machine of the character described consisting of a power shaft, a pinion thereon, parallel driven pressure and loading shafts, gears to drive said shafts in mesh with said pinion but loosely mounted on said shafts, clutches on said shafts for connecting the gears to said shafts, a cam on the power shaft, radially moving cam rollers adapted to be mounted in said gears adapted to be engaged by said cam alternately, a T-shaped clutch shifting lever interconnecting said clutches adapted to be alternately engaged by the clutch shifting rollers on said gears when they are actuated by the cam, rollers carried on the free ends of a clutch shaft arm on the T-shaped clutch shifting mechanism, said arm being pivotally mounted thereon, and means for guiding said rollers on the clutch shifting arm.

21. In a building material machine, a loading mechanism comprising a continuous delivery chute, a hopper therebeneath, a slide cut off carried by said hopper adapted to close the mouth of said chute when the hopper is moved away therefrom, and means for guiding said hopper and cutting off in a predetermined relationship with said chute.

22. In a building material machine, a loading mechanism comprising a continuous delivery chute, a hopper therebeneath, a slide cut off carried by said hopper adapted to close the mouth of said chute when the hopper is moved away therefrom, means for guiding said hopper and cutting off in a predetermined relationship with said chute, means to move said hopper with respect to said chute and means connected thereto adapted to actuate the stirrer through the moving operation, said stirrer being within the hopper.

23. In a building material machine, a loading mechanism comprising a continuous delivery chute, a hopper therebeneath, a slide cut off carried by said hopper adapted to close the mouth of said chute when the hopper is moved away therefrom, means for guiding said hopper and cutting off in a predetermined relationship with said chute, means to move said hopper with respect to said chute and means connected thereto adapted to actuate the stirrer through the moving operation, said stirrer being within the hopper, said moving means consisting of a moving arm having a slot in the lower end thereof, means for moving said arm in an arc whereby means on the hopper reciprocates in said slot, said means consisting of an axle on said hopper and wheels on said axle for supporting said hopper.

24. In a building material machine, a loading mechanism comprising a continuous delivery chute, a hopper in open communication therewith during loading, a slide for cutting off said chute when said hopper passes to delivering position, means for moving said hopper to delivering position consisting of an arm having a slot, means on the hopper reciprocating in said slot as the arm moves, a toothed rack pivoted on said arm, a stirrer in the hopper, a pinion mounted on the stirrer shaft, said pinion and said rack meshing with one another whereby as the hopper reciprocates the stirrer will rotate.

In testimony whereof, we affix our signatures.

ELMER R. MARTIN.
HOWARD C. BYLAND.
CHRISTIAN BALDENHOFER.
FRANK L. ORMESHER.